United States Patent [19]

Milano et al.

[11] Patent Number: 4,597,069
[45] Date of Patent: Jun. 24, 1986

[54] DEPTHSOUNDER/FISH FINDER

[75] Inventors: Steven J. Milano, Lake Ronkonkoma; William C. Jorch, Northport; James Herzel, Dix Hills, all of N.Y.

[73] Assignee: Transdynamics Inc., El Monte, Calif.

[21] Appl. No.: 542,353

[22] Filed: Oct. 17, 1983

[51] Int. Cl.$^4$ .......................... G01S 15/96; G01S 7/66
[52] U.S. Cl. ...................................... 367/95; 367/108; 367/112
[58] Field of Search ................... 367/95, 97, 98, 99, 367/107, 108, 109, 112, 113, 115

[56] References Cited

U.S. PATENT DOCUMENTS

| | | | |
|---|---|---|---|
| 2,721,987 | 10/1955 | Richard | 340/3 |
| 3,297,980 | 1/1967 | Haslett | 340/3 |
| 3,332,056 | 7/1967 | Drenkelfort | 340/3 |
| 3,417,369 | 12/1968 | Richard | 340/3 |
| 3,500,302 | 3/1970 | Moss, Jr. et al. | 367/97 X |
| 3,539,978 | 11/1970 | Stedtnitz | 367/97 X |
| 3,805,224 | 4/1974 | Wenz | 340/3 |
| 4,188,608 | 2/1980 | Richard | 367/93 |
| 4,225,951 | 9/1980 | Menin et al. | 367/105 |

Primary Examiner—Richard A. Farley
Attorney, Agent, or Firm—Pretty, Schroeder, Brueggemann & Clark

[57] ABSTRACT

A depthsounder for selectively measuring either bottom depth or the depth of any fish located beneath a vessel. When operating in a depth mode, the depthsounder automatically adjusts the gain of its receiver to minimize interference and provide a filtered display of bottom depth. When operating in a fish finding mode, the depthsounder likewise automatically adjusts the gain of its receiver to minimize interference in its detection of fish. In addition, the depthsounder suitably processes any return pulses to distinguish those produced by fish from those produced by other objects in the water. When fish are detected, the depthsounder provides a visual display of their depth and an aural alarm whose repetition rate is proportional to the number and size of the fish.

40 Claims, 9 Drawing Figures

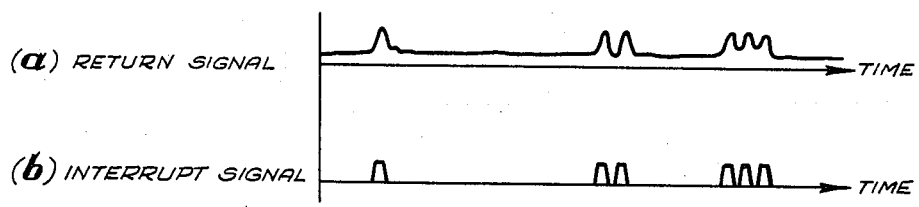
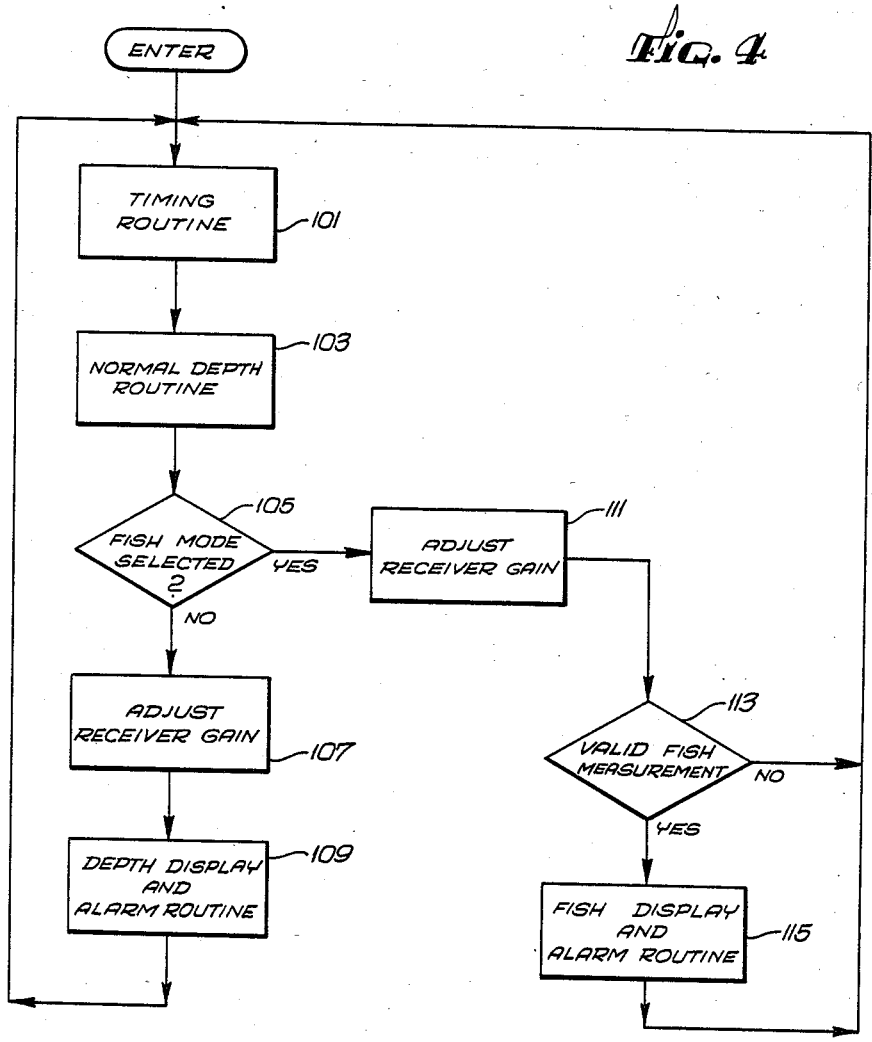

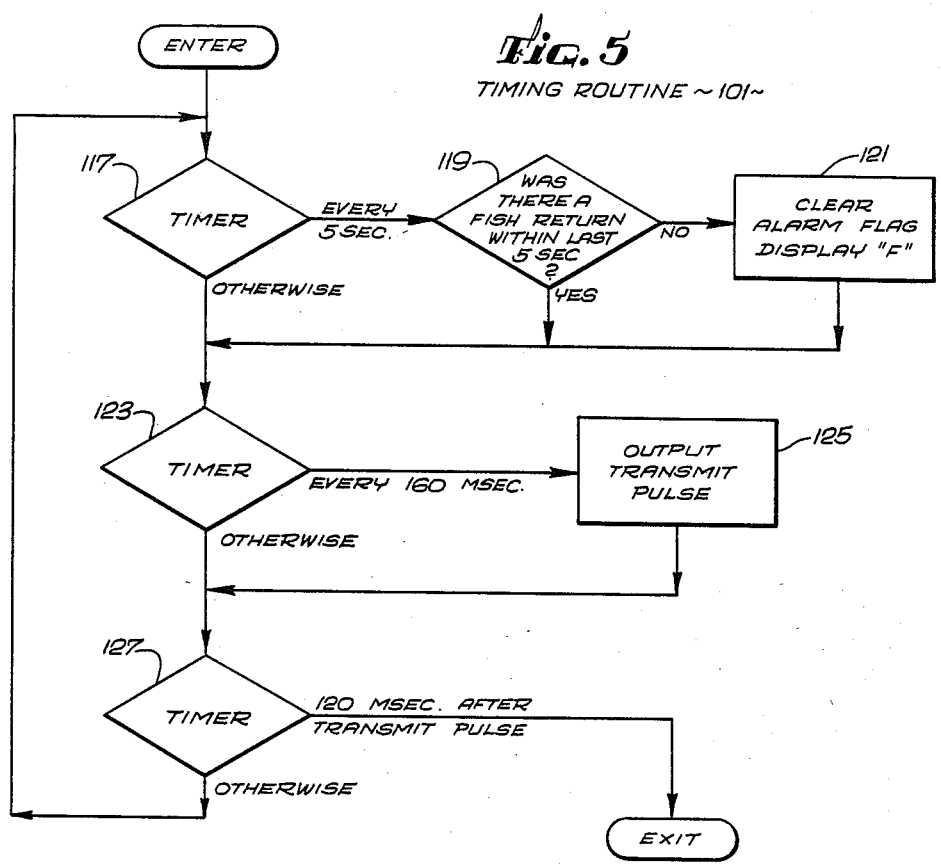
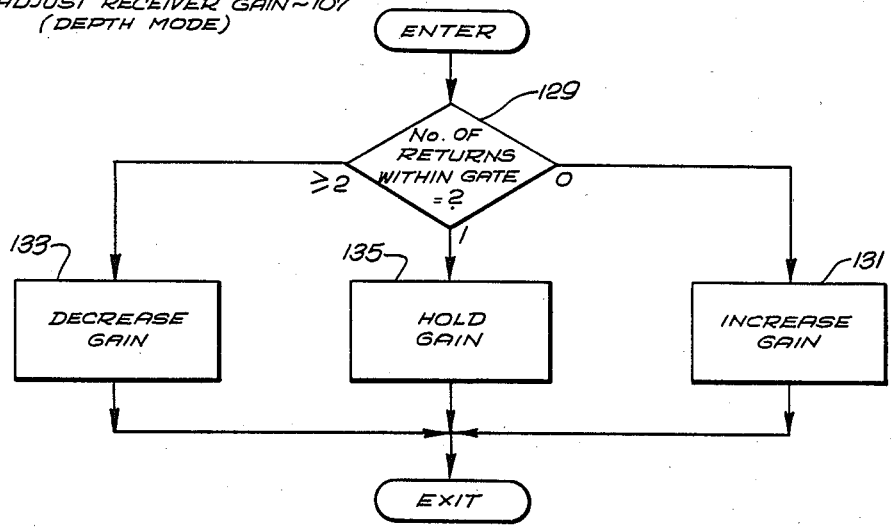

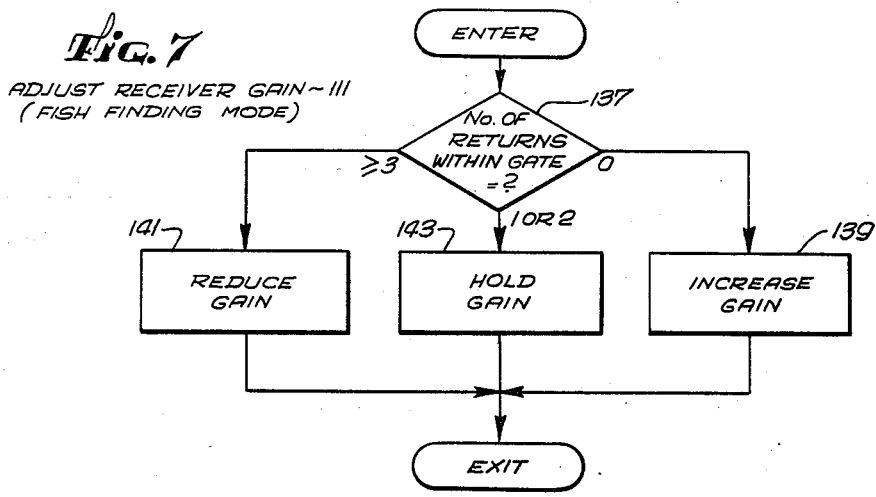
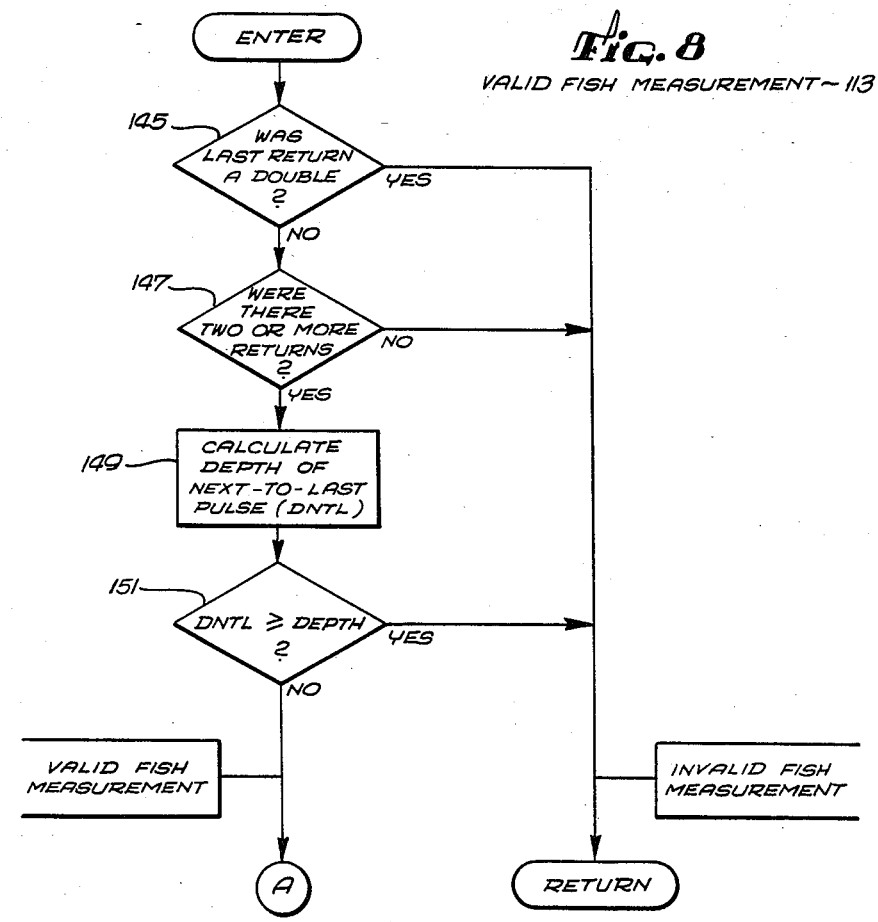

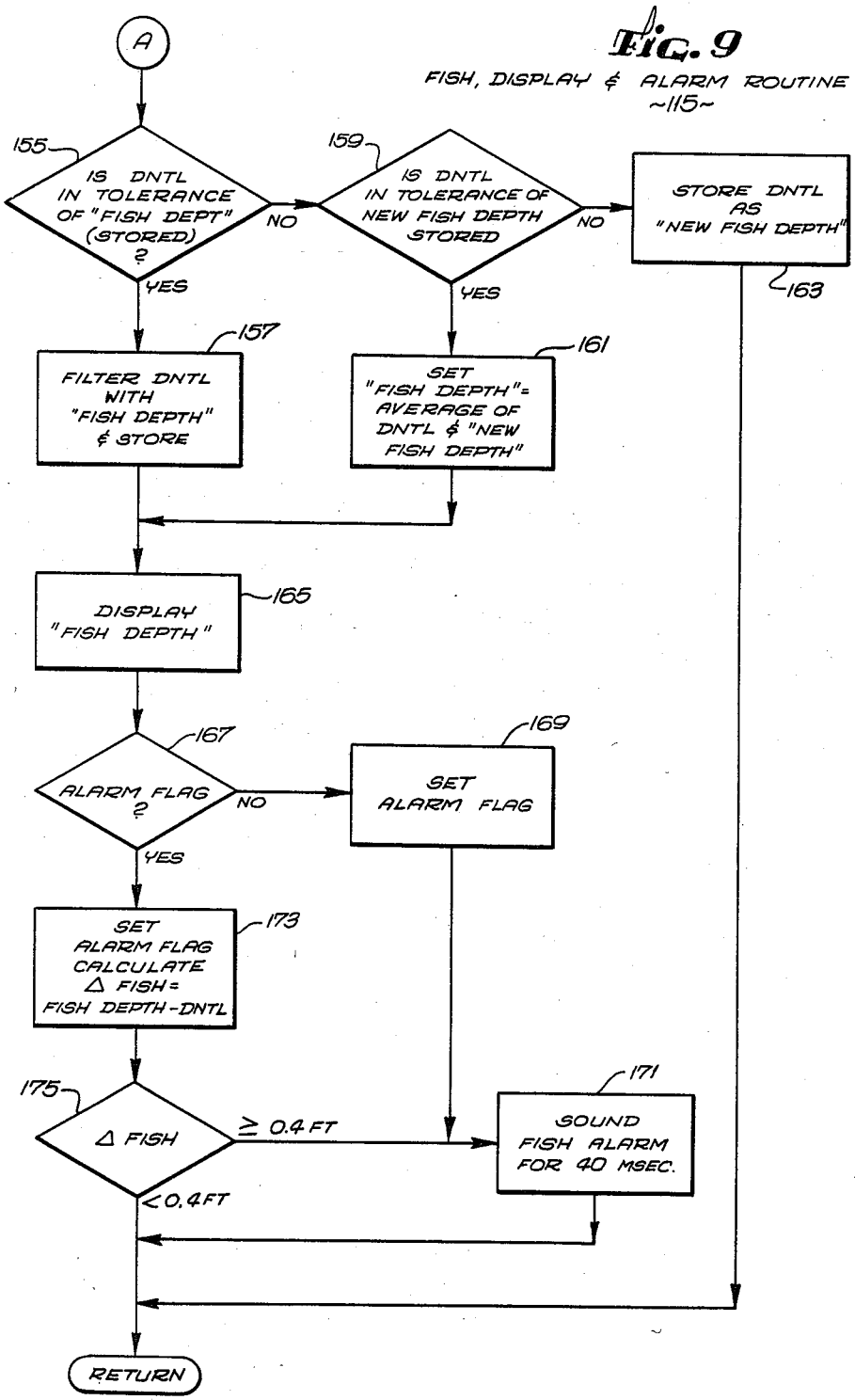

DEPTHSOUNDER/FISH FINDER

BACKGROUND OF THE INVENTION

This invention relates generally to depthsounders, and, more particularly, to depthsounders having special means for minimizing interference and having means for detecting fish.

Depthsounders of this particular kind are typically mounted on marine vessels located on a body of water and are used to determine the depth of the water beneath the vessel. In some instances, the depthsounders are also used to detect the presence of fish in the water beneath the vessel. These depthsounders ordinarily include a transmitter for transmitting into the water a sequence of acoustic transmit pulses, at regular intervals of time. The pulses have a predetermined frequency and are transmitted in a generally vertical direction, whereupon they are reflected by any objects located in the water beneath the vessel and by the bottom limit of the water. A receiver, located in close proximity to the transmitter, detects acoustic information at the predetermined frequency, including reflections of the transmit pulses from objects in the water and from the bottom. The time delay from transmission of each transmit pulse to receipt of a reflected pulse is directly proportional to the depth of the object producing the reflected pulse. The receiver produces a corresponding return signal for suitable processing and display.

Many of the depthsounders of this particular kind include a strip chart recorder for recording the return signal, to produce a two-dimensional image of the water beneath the vessel. This image depicts both the bottom of the water and any fish or other objects located in the water. Unfortunately, however, this kind of display requires the user to analyze the recorded image, looking for known patterns that indicate the bottom location and/or the presence of fish. To minimize the effect of random or stray returns in the recorded image, the receiver associated with this kind of depthsounder typically includes manual adjustment means by which the user can adjust the receiver's sensitivity.

Other depthsounders of this particular kind include simple digital displays of the bottom depth. Some of these depthsounders, in turn, also include a fish finding mode of operation in which the display reads out the depth of any fish detected in the water beneath the vessel. Aural alarms are also sometimes included to indicate when a fish or other object is detected in the water. Although depthsounders of this kind perform satisfactorily in many situations, they sometimes suffer the drawback of triggering the alarm when objects other than fish are detected. These false alarms can frequently be caused by debris or certain kinds of biological layers in the water, which reflect the successive transmit pulses.

Another problem with depthsounders of this particular kind is that they frequently are very susceptible to noise. Random stray returns can sometimes improperly be interpreted as being caused by fish. In addition, multiple returns from the bottom, caused by a spreading or divergence of the transmit pulses, can sometimes likewise improperly be interpreted to represent fish.

It should therefore be appreciated that there is a definite need for an improved depthsounder that can reliably detect the bottom limit of a body of water, with less susceptibility to noise. In particular, there is a need for a system that can automatically adjust the gain of the receiver to compensate for the varying amplitude of the return pulses reflected by the bottom. There is also a need for an improved depthsounder of the kind that can detect fish, which can distinguish better between fish and other objects such as debris and biological layers. The present invention fulfills these needs.

SUMMARY OF THE INVENTION

The present invention is embodied in an improved depthsounder, and a related method, for use on a marine vessel in detecting the depth of the water beneath the vessel and/or the presence of fish beneath the vessel. The depthsounder includes transmitter means for transmitting into the water a sequence of acoustic transmit pulses, at regular intervals of time. These pulses have a predetermined frequency and are transmitted in a generally vertical direction, whereupon they are reflected by the bottom limit of the water and by any other objects, such as fish, located in their path. The depthsounder further includes receiver means located in close proximity to the transmitter means for detecting acoustic information at the predetermined frequency, including reflections of the successive transmit pulses. The receiver means produces a corresponding return signal, and it has an adjustable gain.

In accordance with one aspect of the invention, the depthsounder further includes comparator means for comparing the return signal with a selected threshold, to determine a count of the number of times the signal exceeds the threshold for each transmit pulse, along with gain adjustment means for increasing the gain of the receiver means if the return count is zero and for decreasing the gain if the return count is three or more. In this fashion, the receiver's gain is automatically adjusted so as to minimize interference and provide just one or two return pulses for each transmit pulse, the last of those return pulses representing the bottom.

In other aspects of the invention, the depthsounder further includes means for measuring the time delay to receipt of the last return pulse corresponding to each transmit pulse, to produce a measure of the bottom depth. Filtering means averages the successive measurements to produce a filtered bottom measurement, which is updated with each successive measurement and displayed on a digital display means. Since the time delay between the transmit pulse and the last return pulse varies according to the bottom depth, the depthsounder maximizes efficiency by triggering the transmitter means to emit transmit pulses at a relatively high repetition rate when shallow bottom depths are detected, and at a relatively low repetition rate when deep bottom depths are detected. To minimize undesired effects of multiple and stray return pulses, the depthsounder further includes means for inhibiting the counting of any return pulses that are not detected within a prescribed time window surrounding the previous bottom depth determination.

The depthsounder of the invention can further include fish finder mode means for selectively conditioning the gain adjustment means so as to detect any fish in the water beneath the vessel. In particular, the fish finder mode means selectively decreases the gain of the receiver means for the next transmit pulse only if the return count exceeds two. The measurement means is then conditioned to measure the time delay to the next-to-last return pulse, to produce a fish depth measurement. This measurement is then suitably processed for display on the digital display means.

Since the successive transmit pulses inevitably have a minimum beam width, they impinge on the bottom over at least a limited area, resulting in a return pulse that is substantially longer in duration than the transmit pulse. The receiver means and comparator means can sometimes interpret this extended-duration pulses as several separate return pulses. To eliminate the possibility that one of these return pulses is misconstrued as representing a fish, the depthsounder inhibits the detection of return pulses for a prescribed time period following each detected pulse. In the preferred embodiment, this inhibit period corresponds to a depth of about five to ten percent of the bottom depth plus a fixed distance on the order of several feet.

The depthsounder further includes aural alarm means along with means for actuating the alarm means when two successive fish depth measurements are within a prescribed depth of each other. The requirement for two correlated return pulses before actuating the alarm means minimizes false triggering caused by random return pulses. Subsequent return pulses actuate the alarm means only if they correspond to depths differing from the preceding fish depth measurement by more than a predetermined amount, such as about one-half foot. In this way, schools of fish, which ordinarily exhibit a generally spherical configuration, will result in the generation of several alarm signals, whereas other objects and biological layers ordinarily will not.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 3 is a timing diagram depicting two typical waveforms generated in the depthsounder of FIG. 2;

FIG. 4 is a simplified flowchart depicting the operational steps performed by the microprocessor included in the depthsounder of FIG. 2, in detecting and displaying either bottom depth or fish depth; and FIGS. 5–9 are simplified flowcharts of various routines included in the flowchart of FIG. 4.

DESCRIPTION OF THE PREFERRED EMBODIMENT

Figure 1:
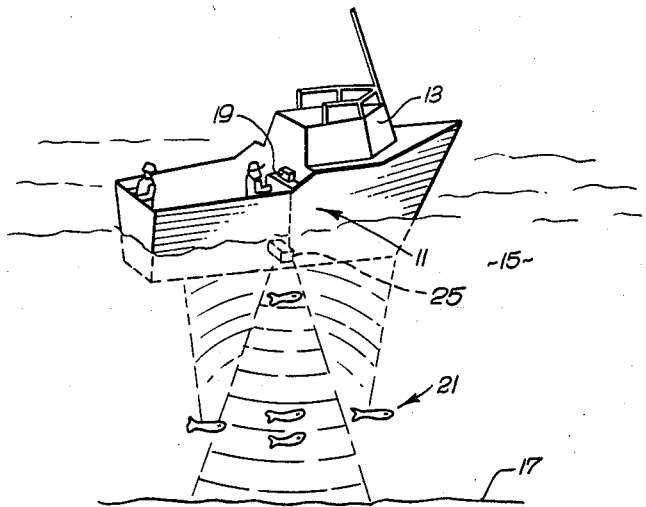
FIG. 1 is a schematic elevational view of a boat camming a depthsounder embodying the present invention, with several fish being depicted beneath the boat.
Figure 2:
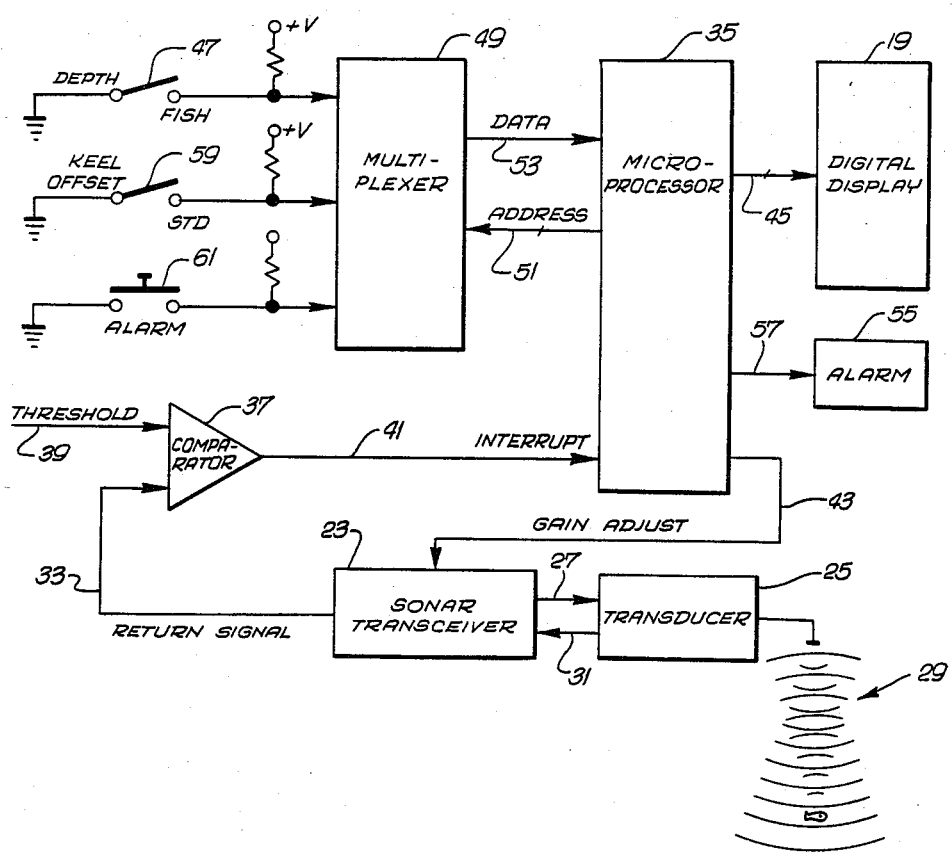
FIG. 2 is a simplified block diagram of the depthsounder embodying the present invention.

Referring now to the drawings, for purposes of illustration, and particularly to FIGS. 1 and 2, there is shown a depthsounder 11 mounted on a boat 13 located on a body of water 15 having a bottom 17. The depthsounder includes two basic operating modes, the first being a depth mode, in which it detects the bottom depth and displays that depth on a digital display 19, and the second being a fish finding mode, in which it detects the presence of any fish 21 beneath the boat and displays their depth on the display.

The depthsounder 11 includes a sonar transceiver 23 and an associated transducer connected together on line 27. These devices are triggered to produce a sequence of acoustic transmit pulses, indicated generally at 29, which have a predetermined frequency and are transmitted into the water 15 beneath the boat 13. The pulses are directed downwardly, in a generally vertical direction, whereupon they impinge on the bottom 17 and/or any fish 21 located in their path, to produce reflected pulses that are transmitted back to the transducer.

The transducer 25 also functions to receive information at the predetermined frequency, including pulses reflected by the bottom 17 and any fish 21 located beneath the boat 13. The resulting receive signal is coupled on line 31 to the sonar transceiver 23, which produces a corresponding return signal for output on line 33. The depthsounder 11 further includes a microprocessor 35 and various support circuitry for suitably processing this return signal to detect the depth of the bottom and/or any fish that might be present beneath the boat.

In one aspect of the invention, implemented whenever the depthsounder 11 is functioning in the depth mode of operation, the microprocessor 35 and an associated comparator 37 continuously monitor the return signal present on line 33 and adjust the sensitivity or gain of the receiver section of the sonar transceiver 23, to minimize interference. In particular, the return signal is compared with a selected threshold supplied to the comparator on line 39. When the signal exceeds the threshold, indicating that a return pulse is being received, the comparator outputs an interrupt pulse for coupling on line 41 to the microprocessor.

The microprocessor 35 counts the number of such interrupt pulses occurring for each transmit pulse, and adjusts the gain of the receiver section of the transceiver 23 accordingly. In particular, if no interrupt pulses are received for any given transmit pulse, the microprocessor deduces that the receiver's gain is too low, and increments it upwardly by a predetermined amount. It performs this gain adjustment by outputting an appropriate gain adjust signal for coupling on line 43 to the transceiver. Conversely, if three or more interrupt pulses are received for any one transmit pulse, the microprocessor deduces that the receiver's gain is too high and outputs an appropriate gain adjust signal on line 43 to reduce the receiver's gain. Only if one or two return pulses are received for each transmit pulse does the microprocessor leave the receiver gain in its current state. The time constant of the gain adjustment feature is preferably on the order of 5 to 10 seconds.

The microprocessor 35 also measures the time delay from the transmission of each transmit pulse by the transceiver 23 and transducer 25 to receipt of the last interrupt pulse that results from it. This measurement indicates the time required for the transmit pulse to reach the bottom 17 and be reflected back to the transducer. The microprocessor generates a signal corresponding to this measurement for coupling on lines 45 to the digital display 19, to display the depth in any desired units, e.g., feet.

In the depth mode of operation, the microprocessor 35 is responsive to interrupt pulses supplied on line 41 from the comparator 37 only during a limited time interval surrounding the time corresponding to the previous depth measurement. This time interval preferably extends from a minimum value corresponding to a depth varying between about three feet and fifteen feet, depending on the depth measurement, and a maximum value corresponding to about 1.5 times the previous depth measurement. The minimum value eliminates most spurious returns produced by debris located near the surface of the water 15, and the maximum limit eliminates the effect of any returns due to multiple reflections off the bottom 17, e.g., "doubles."

The repetition rate of the successive transmit pulses 29 produced by the transducer 25 is ordinarily on the order of about six per second. At depths exceeding about 120 feet, however, this repetition rate is reduced to about two transmit pulses per second. This reduction in repetition rate is required since a longer time duration is required for each transmit pulse to reach the bottom 17 and be reflected back to the transducer. The carrier frequency of each pulse is preferably on the order of 160 kHz to 200 kHz.

The duration of each transmit pulse 29 is preferably on the order of about 0.3 to 0.7 milliseconds, with the exact value depending on any ringing characteristics of the particular transducer 25 being used. At depths exceeding about 120 feet, the return pulses received from the bottom 17 are relatively weak and the receiver gain is therefore correspondingly high. As a consequence, the receiver picks up substantial noise, including noise created by any engine on board the boat 13. At these depths, the duration of each pulse is increased to about 2.5 milliseconds, and the microprocessor 35 is suitably programmed to disregard any return pulses having a duration substantially shorter than that pulse width, e.g., shorter than 1.5 milliseconds. This effectively eliminates engine noises as a source of interference.

The user selects either the depth mode or the fish finding mode using a single-pole, single-throw mode switch 47. The switch is connected to a multiplexer 49, which under the control of address information supplied on lines 51 from the microprocessor 35, outputs a signal indicating the switch's status for coupling on line 53 to the microprocessor.

When the user uses the switch 47 to select the fish finding mode of operation, the microprocessor 35 modifies its processing of the successive interrupt pulses, which as described above occur whenever the transceiver 23 outputs a return pulse exceeding a predetermined threshold. In general, the microprocessor increases the gain or sensitivity of the receiver section of the transceiver so that it can detect the ordinarily weaker return signals reflected by any fish beneath the boat 13. In particular, the microprocessor counts the number of interrupt pulses it receives for each transmit pulse, and regulates the gain of the receiver so that it receives either one or two return pulses. Thus, if it counts zero return pulses for any given transmit pulse, it increases the receiver's gain, and if it receives three or more return pulses for any given transmit pulse, it reduces the receiver's gain. Only if it receives one or two return pulses will it maintain the receiver's gain at its present level. In general, the receiver gain is ordinarily slightly higher in the fish finding mode than in the depth mode, because it is decreased only when three or more return pulses are received, rather than two or more.

Also when the depthsounder 11 is operating in the fish finding mode of operation, the microprocessor 35 is programmed to measure the time delay between each transmit pulse 29 and its resulting next-to-last and last return pulses. The last return pulse of course represents the bottom 17. When two successive measurements are within a prescribed range of each other, they are averaged and appropriately formatted for display on the digital display 19. The requirement for two correlated return pulses before displaying the result minimizes the display of erroneous information caused by random single return pulses. In the preferred embodiment, this range is equal to about 25 percent of the fish depth or four feet, whichever is greater. As will be explained in greater detail below, the average of two or more correlated return pulses is designated a "fish depth" measurement, while one single return is designated a "new fish depth" measurement.

The acoustic transmit pulses 29 produced by the transducer 25 ordinarily have a beam width on the order of about 15 degrees. The pulses therefore impinge on the bottom 17 over a relatively large area. The pulse reflected from the bottom therefore is received by the transducer over a time period substantially longer than the duration of the original transmit pulse. Peaks in this extended duration return pulse can therefore be misinterpreted as several different return pulses, all but the last of which represent fish. To correct for this, the microprocessor 35 is suitably programmed to disregard any pulses it receives within a prescribed time duration immediately following a valid return pulse. This time period is, of course, matched to the beam width of the particular transducer being used. In the preferred embodiment, the time period corresponds to a depth of about six to seven percent of the bottom depth plus about 3 to 3.5 feet. The microprocessor therefore interprets all of the return pulses produced by the bottom as a single return pulse.

The depthsounder 11 further includes an aural alarm 55 (FIG. 2) for use in positively notifying the user when a fish or school of fish 21 is detected. The microprocessor 35 outputs an alarm signal for coupling on line 57 to actuate the alarm whenever two successive fish depth measurements are within a prescribed depth of each other, preferably about 25 percent of the fish depth or four feet, whichever is greater. Requiring two correlated return pulses before actuating the alarm minimizes false triggering caused by random return pulses.

Subsequent return pulses actuate the alarm 55 only if they are from depths differing from the preceding fish depth measurement by more than a predetermined amount, preferably about one-half foot. In this way, schools of fish, which ordinarily exhibit a generally spherical configuration, will generate several alarm signals, whereas other objects such as biological layers ordinarily will not.

FIGS. 1 and 3 depict one exemplary situation in which the depthsounder 11 detects fish 21 located beneath the boat 13. It can be seen that three fish are located directly beneath the boat, in the path of the transmit pulses 29. One fish is located near the surface, and the two remaining fish are a part of a school located near the bottom 17. FIG. 3a depicts the return signal that is output by the transceiver 23 on line 33 for the transmit pulse that encounters these fish. It will be observed that the first fish produces a return pulse after a relatively short time delay, the two remaining fish produce a pair of pulses after a longer time delay, and the bottom 17 produces a relatively long pulse after an even longer time delay.

After comparing the return signal with the predetermined threshold, the comparator 37 outputs the interrupt signal (FIG. 3b) on line 41. It will be observed that each fish provides a separate interrupt pulse, and that the bottom 17 provides three closely-spaced interrupt pulses. As previously mentioned, the microprocessor 35 is programmed to disregard any interrupt pulses occurring within a prescribed time period following a preceding valid pulse. Accordingly, it disregards the return from the third fish, since it closely follows that for the second fish, and it also disregards the second and third returns from the bottom, since they closely follow the first bottom return pulse.

In addition, the microprocessor 35 measures the time delay from the transmit pulse 29 to receipt of the next-to-last valid return pulse, which in this instance happens to correspond to the second fish, and it outputs a corresponding fish depth signal on lines 45 for coupling to the digital display 19. As an added note, since more than two return pulses were received for this particular transmit pulse, the microprocessor decreases the gain of the receiver section of the transceiver 23 for the next transmit pulse.

As shown in FIG. 2, the depthsounder 11 further includes a single-pole, single-throw keel-offset switch 59 for use in selectively instructing the microprocessor 35 to add to each depth or fish measurement a predetermined offset corresponding to the depth of the transducer 25 below the water surface. The displayed value then indicates the depth below the water surface, rather than depth below the transducer. The switch is connected to the microprocessor via the multiplexer 49.

Alternatively, if the transducer 25 is located above the boat's keel, the switch 59 can be used to instruct the microprocessor 35 to subtract from each depth measurement an offset equal to the difference in depth measurement an offset equal to the difference in depth between the transducer and the keel. The displayed value then indicates the depth below the keel, which is important when operating in very shallow water.

A momentary alarm switch 61 is also included for permitting the user to manually enable or disable the aural alarm 55. It is connected to the microprocessor 35 via the multiplexer 49. Each time the user actuates the switch, the microprocessor reverses the enable/disable mode.

With reference now to FIGS. 4-9, the detailed operational steps performed by the microprocessor 35 in carrying out the operations described generally above, will be described. FIG. 4 is a general flowchart summarizing the entire relevant operation of the microprocessor. When first enabled, the microprocessor, at step 101, executes a timing routine, in which it triggers the successive transmit pulses 29 and determines the appropriate time to process the return information. A more detailed version of this routine is provided in FIG. 5, described below.

After the microprocessor 35 executes the timing routine, it advances to step 103, designated the normal depth routine, where it measures the time delay to the last return pulse, representing the bottom depth. Thereafter, the microprocessor, at step 105, determines whether or not the mode switch 47 is in the fish finding mode position. If not, it is deduced that the depthsounder 11 should be operating in the depth mode, in which case the microprocessor, at step 107, adjusts the gain of the receiver section of the transceiver, to minimize interference. A more detailed representation of this step 107 is provided in FIG. 6, described below. Thereafter, at step 109, the microprocessor executes a depth display and alarm routine, in which it displays the bottom depth on the digital display 19. The microprocessor then returns to the initial timing routine 101.

As soon as the microprocessor 35 detects at step 105 that the mode switch 47 has been moved to the fish finding mode position, it advances to step 111, where it adjusts the receiver gain to optimize its detection of fish. A more detailed version of this gain adjustment routine is provided in FIG. 7, described below.

The microprocessor then determines at step 113 whether or not a valid fish depth measurement has been made. A more detailed version of this step is provided in FIG. 8, described below. If it is determined that a valid fish measurement has not been made, the microprocessor returns to the initial timing routine 101. If, on the other hand, it is determined that a valid fish measurement has been made, the microprocessor advances to step 115 where it executes a fish, display and alarm routine. In this routine, it determines whether or not to update the display 19 and to actuate the alarm 55. A more detailed version of this routine is provided in FIG. 9, described below.

With reference now to FIG. 5, the timing routine 101 of FIG. 4 will be described. In a first step 117 it is determined whether or not an internal five second timer has timed out. If it has, it is determined at step 119 whether or not a return pulse from a fish was received within the preceding five seconds. If not, the microprocessor 35, at step 121, clears its internal alarm flag and, in addition, outputs a mere "F" to the digital display 19. Thus, unless a displayed fish depth measurement is updated within five seconds, it is deleted from the display. This is thought to be sufficient time for the user to hear the aural alarm 55 and then inspect the display to determine the fish depth.

Once step 121 has been performed, or if it was determined at step 117 that a valid fish return pulse had indeed been received within the preceding five seconds, the microprocessor proceeds to step 123, where it determines whether or not an internal 160 millisecond timer has timed out. If it has timed out, then it is time to trigger the transceiver 23 and transducer 25 to output a new transmit pulse 29. This is done at step 125.

After a transmit pulse 29 has been triggered at step 125, or if it is determined at step 123 that the 160 millisecond timer has not yet timed out, the microprocessor 35 proceeds to step 127 where it determines whether or not 120 milliseconds have elapsed since the triggering of the last transmit pulse. If it has not, the microprocessor returns to the initial step 117 of monitoring the five second timer. If the 120 millisecond time delay has elapsed, on the other hand, it is deduced that it is now time to perform the specified operations on any return pulses received during that period. When this occurs, the microprocessor exits this routine. The 120 millisecond delay is selected because it corresponds approximately to the maximum depth that can be ordinarily detected. When the pulse repetition rate is decreased to two per second, which occurs when the bottom depth exceeds about 120 feet, this time delay value is increased to about 500 milliseconds, allowing sufficient time to receive the deeper return pulses.

FIG. 6 depicts the routine 107 (FIG. 4) performed by the microprocessor 35 in adjusting the gain of the receiver section of the transceiver 23 when the depthsounder 11 is operating in the depth mode. In an initial step 129, the microprocessor determines how many return pulses were received within the prescribed time interval surrounding the previous bottom depth measurement. If no return pulses were received, it is deduced that the receiver gain was too low, and it is therefore increased, at step 131. If three or more return pulses were received during the time interval, it is deduced that the receiver gain was too high, and it is therefore reduced at step 133. Only if one or two return pulses were received in the time period is the receiver gain maintained at its previous level. This is done at step 135. Following each of steps 131, 133, and 135, this routine is exited.

With reference now to FIG. 7, the receiver gain adjustment routine 111 of FIG. 4, which is followed in the fish finding mode of operation, will be described. In an initial step 137, the microprocessor 35 determines the number of return pulses occurring during the predetermined limited time period surrounding the previous bottom measurement. If it determines that no return pulses were received during this time period, it increases the receiver's gain at step 139. If, on the other hand, it determines that three or more return pulses were received in that time period, it reduces the receiver's gain at step 141. Finally, if it determines that just one or two return pulses were received, it maintains the receiver's gain at its present level, at step 143. In any case, the program then exits this routine.

FIG. 8 depicts the routine 113 of FIG. 4, in which the microprocessor 35 determines whether or not a valid depth measurement has been made. In an initial step 145, the microprocessor determines whether or not the last return pulse is a "double" of the next-to-last return pulse. If so, then the next-to-last return pulse does not represent a fish, i.e., is an invalid fish measurement and the routine is exited. If it is determined at step 145 that the last return is not a double of the next-to-last return, the microprocessor proceeds to step 147 where it is determined whether or not there were two or more returns for the current transmit pulse. If not, no fish were detected, and the routine is exited. If, on the other hand, there were two or more returns, the microprocessor at step 149, calculates the depth of the next-to-last return pulse, which is designated "DNTL". It then determines at step 141 whether or not DNTL is greater than or equal to the previous depth measurement. If so, it is deduced that this next-to-last return was actually produced by the bottom 17 and not a fish, whereupon the routine is exited. On the other hand, if the DNTL is not equal to or greater than the previous depth measurement, it is deduced that it is indeed a valid fish measurement.

FIG. 9 is a detailed flowchart of the routine 115 of FIG. 4 performed by the microprocessor 35 in determining whether or not to update the digital display 19 or to actuate the alarm 55. Before describing this routine in detail, it should be recalled that there are two possible prior fish depth measurements at any given time. One, designated "fish depth", is very reliable. It represents the average of prior return pulses within a prescribed range of each other for two or more prior transmit pulses 19. Only measurements of this kind, based on two correlated return pulses are displayed on the digital display 19. The other prior fish depth measurement, designated "new fish depth," is not as reliable an indication of an actual fish, because it is based on a return pulse for just a single transmit pulse. This measurement is stored, but not displayed on the digital display.

In an initial step 155, it is determined whether or not the depth of the next-to-last return, i.e., DNTL, is within the prescribed distance of the prior "fish depth" measurement, if any, which is stored in the microprocessor 35 and displayed on the digital display 19. It will be recalled that this prescribed distance tolerance corresponds to about four feet or 25 percent of the fish depth, whichever is greater. If the DNTL is within the tolerance, indicating that the present return pulse is from the same fish or school of fish, the microprocessor, at step 157, filters this DNTL with the stored "fish depth" by averaging the two, storing the filtered signal as an updated "fish depth". If there is no prior "fish depth" measurement, the letter "F" is displayed to indicate to the user that the apparatus is operating in the fish finding mode.

If there is no prior "fish depth" measurement being stored and displayed, or if the DNTL is not within the prescribed tolerance of it, the microprocessor 35 proceeds to step 159, where it determines whether or not the DNTL is within the prescribed tolerance of the "new fish depth" measurement, which may or may not be stored (but not displayed). Such a "new fish depth" measurement represents a return pulse from a single prior transmit pulse 29. If the DNTL is within the tolerance, then it is assumed that the two successive return pulses result from a fish and their average is sufficiently reliable to merit display. Accordingly, the microprocessor then, at step 161, computes that average and designates it the "fish depth" measurement.

If there was no previously stored "new fish depth" measurement, or if the DNTL is not within the prescribed tolerance of such a stored "new fish depth", the microprocessor 35 proceeds to step 163, where it stores the DNTL as the "new fish depth" measurement. This routine is then exited.

If the "fish depth" measurement was updated at step 157 or computed for the first time at step 161, the microprocessor 35 proceeds to step 165, where that measurement is displayed. Therafter, it determines, at step 167 whether or not an alarm flag has been previously set. An alarm flag indicates that the alarm 55 has previously been actuated. If the alarm flag has not been set, the microprocessor does so at step 169 and then, at step 171, actuates the alarm for a duration of about 40 milliseconds. It then exits this routine.

If, on the other hand, it is determined at step 167 that the alarm flag has previously been set, the microprocessor 35 calculates the difference between the DNTL and the previously-stored "fish depth" measurement at step 173. If it is then determined at step 175 that difference exceeds about 0.4 feet, indicating that the transmit pulse 29 very likely impinged on a different fish in a school of fish, the microprocessor proceeds to the step 171, where it actuates the alarm 55 for a duration of about 40 milliseconds. If, on the other hand, it is determined at step 175 that the DNTL does not differ from the previously stored "fish depth" measurement by at least 0.4 feet, the alarm is not actuated, and the routing is exited. The alarm is not actuated in this circumstance, because it is deduced that the current return pulse is from either a biological layer at substantially the same depth as the previously stored "fish depth" measurement or results from the same fish that produced the previous "fish depth" measurement. In either case, an alarm is not desired.

It should be appreciated from the foregoing description that the present invention provides an improved depthsounder for selectively providing a reliable measurement of either the bottom depth or the depth of any fish located beneath a vessel. When operating in a depth mode, the depthsounder automatically adjusts the gain of its receiver so as to minimize interference and provide a reliable, filtered estimate of bottom depth. When operating in a fish finding mode, the depthsounder likewise automatically adjusts its gain to minimize interference in its detection of fish. In addition, it suitably processes any return pulses to distinguish between those pulses that are produced by fish from those produced by other sources such as certain biological layers or other non-fish debris. Only when an actual fish, or school of fish, is detected, will its depth be displayed and an alarm actuated.

Although the present invention has been described in detail with reference to the presently-preferred embodiment, it will be understood by those of ordinary skill in the art that various modifications can be made without departing from the invention. Accordingly, the invention is limited only by the following claims.

We claim:

1. A depthsounder for use on a marine vessel to determine the depth of the water beneath it, comprising:
    transmitter means for transmitting into the water a sequence of acoustic transmit pulses at regular intervals of time, the pulses having a predetermined frequency and being transmitted in a generally vertical direction, whereupon they are reflected by the bottom limit of the water;
    receiver means located in close proximity to the transmitter means for detecting acoustic information at the predetermined frequency, including reflections of the transmit pulses from the bottom limit of the water, the receiver means producing a corresponding return signal;
    comparator means for comparing the return signal with a selected threshold and for determining the number of times the signal exceeds the threshold for each transmit pulse, thereby producing a return count for each transmit pulse; and
    gain adjustment means for increasing the gain of the receiver means if the return count is zero and for decreasing the gain of the receiver means if the return count exceeds one, whereby the depthsounder is automatically adjusted to minimize interference.

2. A depthsounder as defined in claim 1, and further including the comparator means includes measurement means, operable whenever the comparator means determines that the return signal exceeds the selected threshold at least one time, for measuring the time delay between the transmitting by the transmitter means of each transmit pulse and the receipt by the receiving means of the corresponding pulse after reflection by the bottom limit of the water, to produce a bottom measurement.

3. A depthsounder as defined in claim 2, and further including:
    filtering means for filtering the successive bottom measurements to produce a filtered bottom measurement that is updated with each successive bottom measurement; and
    display means for displaying the filtered bottom measurement.

4. A depthsounder as defined in claim 2, wherein the transmitter means includes means for adjusting the repetition rate of the transmit pulses as a function of the preceding bottom measurements.

5. A depthsounder as defined in claim 2, wherein the comparator means includes means for enabling the determination of the number of times the return signal exceeds the selected threshold only during a time interval corresponding to a prescribed range of locations spanning the previous bottom measurement.

6. A depthsounder as defined in claim 2, wherein the measurement means includes means for selectively adding or subtracting a predetermined offset to the bottom measurement, to account for the depth of the transmitter means and receiver means below the water surface.

7. A depthsounder as defined in claim 1, and further including fish finder mode means for selectively conditioning the gain adjustment means so as to detect any fish in the body of water, the fish finder mode means selectively causing the gain adjustment means to increase the gain of the receiver means if the return count is zero and to decrease the gain if the return count is greater than two, wherein if the return count is two or more, all but the last count represent fish in the water.

8. A depthsounder as defined in claim 7, wherein:
    the comparator means includes measurement means, operable whenever the comparator means determines that the return signal exceeds the threshold at least two times, for measuring the time delay between the transmitting by the transmitter means of each transmit pulse and the receipt by the receiving means of the corresponding pulse after reflection by a fish, to produce a fish depth measurement; and
    the depthsounder further includes display means for displaying the successive fish depth measurements.

9. A depthsounder as defined in claim 1, wherein the comparator means includes means, operable each time the return signal exceeds the selected threshold, for measuring the length of time it exceeds the threshold, and means for counting the number of times the signal exceeds the threshold for at least a prescribed time duration, to produce the return count for each transmit pulse, whereby the effect of noise on the successive return counts is reduced.

10. Fish detection apparatus for use on a marine vessel to detect the presence of fish beneath the vessel, the apparatus comprising:
    transmitter means for transmitting into the water a sequence of acoustic transmit pulses at regular intervals of time, the transmit pulses having a predetermined frequency and being transmitted in a generally vertical direction, whereupon they are reflected by any objects such as fish in the water and by the bottom limit of the water;
    receiver means located in close proximity to the transmitter means for detecting acoustic information at the predetermined frequency, including reflections of the transmit pulses from any fish in the water and from the bottom limit of the water, the receiver means producing a corresponding return signal;
    comparator means for comparing the return signal with a selected threshold and producing a return pulse each time the signal exceeds the threshold, the last return pulse associated with each transmit pulse representing the bottom limit of the water and any earlier return pulses representing objects such as fish in the water;
    measurement means for measuring the time delay between the transmitting of each transmit pulse and the receipt of at least one of the resulting return pulses, if any, other than the last return pulse, to produce a succession of fish depth measurements;
    alarm means; and
    detection means for comparing each fish depth measurement with a prior fish depth measurement, determining that a fish is present in the water if the two measurements are within a first predetermined distance of each other, the detection means also actuating the alarm means when it determines a fish is present.

11. Fish detection apparatus as defined in claim 10, wherein the measurement means produces each fish depth measurement by measuring the time delay between the transmitting of each transmit pulse and the receipt of the corresponding next-to-last return pulse, if any.

12. Fish detection apparatus as defined in claim 10, wherein the first predetermined distance used in the detection means is about four feet or 25 percent of the fish depth measurement, whichever is greater.

13. Fish detection apparatus as defined in claim 10, wherein the detection means includes means for again actuating the alarm means only when the current fish depth measurement differs from the previous measurements by more than a second predetermined distance.

14. Fish detection apparatus as defined in claim 13, wherein the second predetermined distance used in the detection means is about one-half foot.

15. Fish detection apparatus as defined in claim 10, wherein:
the alarm means produces an aural signal; and
the apparatus further includes means for providing a visual display of the successive fish depth measurements.

16. Fish detection apparatus as defined in claim 10, wherein the comparator means includes means for producing a return pulse only when the return signal exceeds the selected threshold for a prescribed time duration, whereby the false production of a return pulse because of noise is reduced.

17. Fish detection apparatus for use on a marine vessel to detect the presence of fish beneath the vessel, the apparatus comprising:
transmitter means for transmitting into the water a sequence of acoustic transmit pulses at regular intervals of time, the transmit pulses having a predetermined frequency and being transmitted in a generally vertical direction, whereupon they are reflected by any objects such as fish in the water and by the bottom limit of the water;
receiver means located in close proximity to the transmitter means for detecting acoustic information at the predetermined frequency, including reflections of the transmit pulses from any fish in the water and from the bottom limit of the water, the receiver means producing a corresponding return signal;
comparator means for comparing the return signal with a selected threshold and producing a return pulse each time the signal exceeds the threshold, to produce a sequence of return pulses for each transmit pulse;
bottom blanking means for disregarding any return pulses in the sequence following within a prescribed time period a preceding return pulse that was not disregarded, to produce a modified sequence of return pulses for each transmit pulse, the last return pulse in each modified sequence representing the bottom limit of the water and any earlier return pulses in the modified sequence representing objects such as fish in the water; and
measurement means for measuring the time delay between the transmitting of each transmit pulse and the receipt of at least one of the resulting return pulses in the modified sequence, if any, other than the last return pulse, to produce a sequence of fish depth measurements.

18. Fish detection apparatus as defined in claim 17, and further including:
means for comparing the successive fish depth measurments with each other; and
display means for displaying a fish depth measurement when two successive measurements are within a prescribed limited range of each other.

19. Fish detection apparatus as defined in claim 17, wherein the prescribed time period used in the bottom blanking means corresponds to a depth of about six to seven percent of the bottom depth plus about 3 to 3.5 feet.

20. Fish detection apparatus as defined in claim 17, wherein the comparator means includes means for producing a return pulse only when the return signal exceeds the selected threshold for at least a prescribed time duration, whereby the false production of a return pulse because of noise is reduced.

21. A method for determining the depth of the water beneath a marine vessel comprising steps of:
transmitting into the water a sequence of acoustic transmit pulses at regular intervals of time, the pulses having a predetermined frequency and being transmitted in a generally vertical direction, whereupon they are reflected by the bottom limit of the water;
receiving acoustic information at the predetermined frequency, including reflections of the transmit pulses from the bottom limit of the water, the step of receiving including a step of producing a corresponding return signal using a receiver having an adjustable gain;
comparing the return signal with a selected theshold and determining the number of times the signal exceeds the threshold for each transmit pulse, thereby producing a return count for each transmit pulse; and
increasing the gain of the receiver if the return count is zero and decreasing the gain of the receiver if the return count exceeds one, whereby the method for determining depth automatically minimizes interference.

22. A method as defined in claim 21, and further including a step of measuring, performed whenever the step of comparing determines that the return signal exceeds the selected threshold at least one time, the measuring step measuring the time delay between the transmitting of each transmit pulse and the receipt of the corresponding pulse after reflection by the bottom limit of the water, to produce a bottom measurement.

23. A method as defined in claim 22, and further including steps of:
filtering the successive bottom measurements to produce a filtered bottom measurement that is updated with each successive bottom measurement; and
displaying the filtered bottom measurement.

24. A method as defined in claim 22, wherein the step of transmitting includes a step of adjusting the repetition rate of the transmit pulses as a function of the preceding bottom measurements.

25. A method as defined in claim 22, wherein the step of comparing includes a step of enabling the determination of the number of times the return signal exceeds the selected threshold only during a time interval corresponding to a prescribed range of locations spanning the previous bottom measurement.

26. A method as defined in claim 22, wherein the step of measuring includes a step of selectively adding or subtracting a predetermined offset to the bottom measurement, to account for the depth below the water surface the steps of transmitting and receiving occur.

27. A method as defined in claim 21, and further including a step of selectively modifying the steps of increasing and decreasing so as to detect any fish in the body of water, the step of increasing then increasing the gain of the receiver if the return count is less than two and the step of decreasing then decreasing the gain if the return count is greater than two, wherein if the return count is two or more, all but the last count represent fish in the water.

28. A method as defined in claim 27, wherein:
the step of comparing includes a step of measuring, performed whenever the step of comparing determines that the return signal exceeds the threshold at least two times, the measuring step measuring the time delay between the transmitting of each transmit pulse and the receipt of the corresponding pulse after reflection by a fish, to produce a fish depth measurement; and
the method further includes a step of displaying the successive fish depth measurements.

29. A method as defined in claim 21, wherein the step of comparing includes steps of measuring the time duration each time the return signal exceeds the selected threshold, and counting the number of times the signal exceeds the threshold for at least a prescribed time duration, to produce the return count for each transmit pulse, whereby the effect of noise on the successive return count is reduced.

30. A method for detecting the presence of fish in the water beneath a marine vessel, the method comprising steps of:
transmitting into the water a sequence of acoustic transmit pulses at regular intervals of time, the transmit pulses having a predetermined frequency and being transmitted in a generally vertical direction, whereupon they are reflected by any objects such as fish in the water and by the bottom limit of the water;
receiving acoustic information at the predetermined frequency, including reflections of the transmit pulses from any fish in the water and from the bottom limit of the water, the step of receiving including a step of producing a corresponding return signal;
comparing the return signal with a selected threshold and producing a return pulse each time the signal exceeds the threshold, the last return pulse associated with each transmit pulse representing the bottom limit of the water and any earlier return pulses representing objects such as fish in the water;
measuring the time delay between the transmitting of each trasmit pulse and the receipt of at least one of the resulting return pulses, if any, other than the last return pulse, to produce a succession of fish depth measurements; and
comparing each fish depth measurement with a prior fish depth measurement, determining that a fish is present in the water if the two measurements are within a first determined distance of each other, and actuating an alarm when it is determined a fish is present.

31. A method as defined in claim 30, wherein the step of measuring means produces each fish depth measurement by measuring the time delay between the transmitting of each transmit pulse and the receipt of the corresponding next-to-last return pulse, if any.

32. A method as defined in claim 30, wherein the first predetermined distance used in the step of comparing is about four feet or 25 percent of the fish depth measurement, whichever is greater.

33. A method as defined in claim 30, and further including a step of again actuating the alarm only when the current fish depth measurement differs from the previous measurements by more than a second predetermined distance.

34. A method as defined in claim 33, wherein the second predetermined distance used in the step of comparing is about one-half foot.

35. A method as defined in claim 30, wherein:
the alarm produces an aural signal; and
the method further includes a step of visually displaying of the successive fish depth measurements.

36. A method as defined in claim 30, wherein the step of comparing includes a step of producing a return pulse only when the return signal exceeds the selected threshold for at least a prescribed time duration, whereby the false production of a return pulse because of noise is reduced.

37. A method for detecting the presence of fish in the water beneath a marine vessel, the method comprising steps of:
transmitting into the water a sequence of acoustic transmit pulses at regular intervals of time, the transmit pulses having a predetermined frequency and being transmitted in a generally vertical direction, whereupon they are reflected by any objects such as fish in the water and by the bottom limit of the water;
receiving acoustic information at the predetermined frequency, including reflections of the transmit pulses from any fish in the water and from the bottom limit of the water, the step of receiving including a step of producing a corresponding return signal;
comparing the return signal with a selected threshold and producing a return pulse each time the signal exceeds the threshold to produce a sequence of return pulses for each transmit pulse;
disregarding any return pulses in the sequence following within a prescribed time period a preceding return pulse that was not disregarded, to produce a modified sequence of return pulses for each transmit pulse, the last return pulse in each modified sequence representing the bottom limit of the water and any earlier return pulses in the sequence representing objects such as fish in the water; and
measuring the time delay between the transmitting of each transmit pulse and the receipt of at least one of the resulting return pulses in the modified sequence, if any, other than the last return pulse, to produce a sequence of fish depth measurements.

38. A method as defined in claim 37, and further including steps of:
comparing the successive fish depth measurements with each other; and
displaying a fish depth measurement when two successive measurements are within a prescribed limited range of each other.

39. A method as defined in claim 37, wherein the prescribed time period used in the step of disregarding corresponds to a depth of about six to seven percent of the bottom depth plus about 3 to 3.5 feet.

40. A method as defined in claim 37, wherein the step of comparing includes a step of producing a return pulse only when the return signal exceeds the selected threshold for at least a prescribed time duration, whereby the false production of a return pulse because of noise is reduced.

* * * * *